(12) United States Patent
Warncke et al.

(10) Patent No.: US 9,486,082 B2
(45) Date of Patent: Nov. 8, 2016

(54) HANGER APPARATUS AND METHOD OF HANGING

(71) Applicant: Sauder Manufacturing Co., Archbold, OH (US)

(72) Inventors: Anthony J. Warncke, Archbold, OH (US); Joel D. Alberda, Leo, IN (US)

(73) Assignee: Sauder Manufacturing Co., Archbold, OH (US)

( * ) Notice: Subject to any disclaimer, the term of this patent is extended or adjusted under 35 U.S.C. 154(b) by 42 days.

(21) Appl. No.: 14/225,607

(22) Filed: Mar. 26, 2014

(65) Prior Publication Data

US 2014/0291460 A1 Oct. 2, 2014

Related U.S. Application Data

(60) Provisional application No. 61/806,445, filed on Mar. 29, 2013.

(51) Int. Cl.
| | | |
|---|---|---|
| A47G 29/00 | (2006.01) | |
| A47C 9/06 | (2006.01) | |
| F16M 13/02 | (2006.01) | |

(52) U.S. Cl.
CPC .............. *A47C 9/06* (2013.01); *F16M 13/02* (2013.01); *Y10T 29/49826* (2015.01)

(58) Field of Classification Search
CPC ..................................................... A47C 9/06
USPC ................... 248/220.22; 211/106.01, 85.7
See application file for complete search history.

(56) References Cited

U.S. PATENT DOCUMENTS

| | | |
|---|---|---|
| 275,533 A | 4/1883 | Sparks |
| 4,441,683 A * | 4/1984 | Mayne ........................... 248/558 |
| 5,622,345 A | 4/1997 | Hopkins |
| 6,089,651 A | 7/2000 | Carmen |
| 6,508,449 B2 * | 1/2003 | Veazey ................. A47F 5/0846 211/87.01 |
| 6,896,322 B1 | 5/2005 | Foy |
| 8,136,775 B2 * | 3/2012 | Chiang .................. A47B 97/00 211/87.01 |
| 2008/0149002 A1 * | 6/2008 | Gardner ........................... 108/6 |

(Continued)

FOREIGN PATENT DOCUMENTS

| | | |
|---|---|---|
| CN | 202143527 | 2/2012 |
| GB | 16566 | 11/1909 |

OTHER PUBLICATIONS

Author(s): Unknown, Folding Chair Hanging Option. Believed presented to employees of Applicants' Assignee on or about Oct. 28, 2010. Directed to the results of a survey of competitor products. Includes two pages of illustrations showing ideas of employees of Assignee (specific employees unknown). 15 printed pages of Power Point Presentation. Presentation or publishing locations unknown.

(Continued)

*Primary Examiner* — Kristina Junge

(74) *Attorney, Agent, or Firm* — McGarry Bair PC

(57) ABSTRACT

A hanger apparatus (10) comprises an anchor (12), hook (14), fastener (16), second fastener (18), exterior casing or shell (20) and secondary fastener (22). The anchor (12) is attached to a vertical structure such as a wall by a series of the second fasteners (18). The anchor (12) includes an opening through which the first fastener (16) is disposed to securely attach the hanger (10) to a structural member, such as a wall. The hook (14) can be firmly attached to the shell (20) through the secondary fastener (22).

15 Claims, 16 Drawing Sheets

(56) References Cited

U.S. PATENT DOCUMENTS

2010/0059642 A1* 3/2010 McLeod .................. 248/207
2011/0180501 A1 7/2011 Lin

OTHER PUBLICATIONS

Author(s): Unknown, Untitled. Consists of copies of three photographs of a sculpted wood mock-up hanger displayed for purposes of "voice-of-customer" feedback at NeoCon 2011, believed to be held in Chicago, Illinois. Mock-up was attached to a back side of a pillar at the back of other NeoCon exhibit space being used by the Assignee. It is believed that the "focus" of the mock-up hanger display was a determination as to whether potential customers responded positively to shape, wall placement, chair presentation (while on the hanger) and chair removal.

* cited by examiner

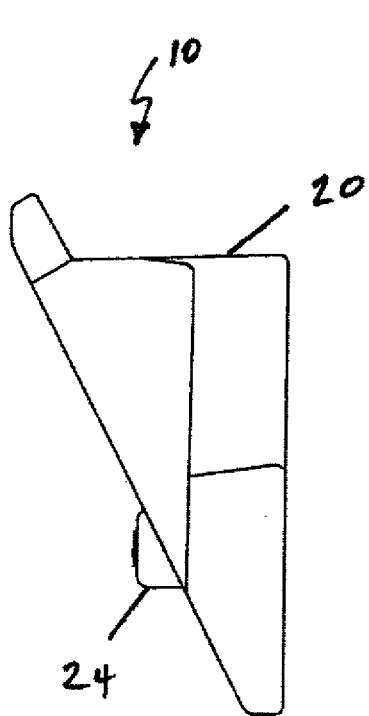
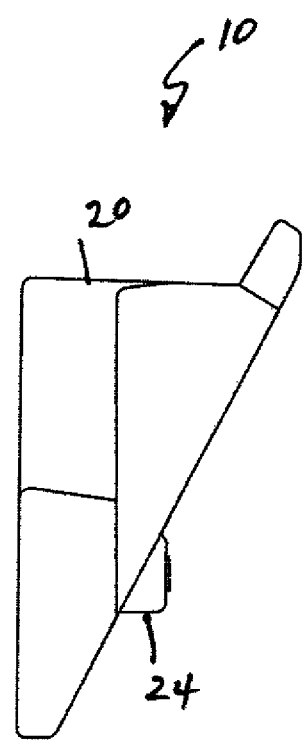
FIG. 7
FIG. 8

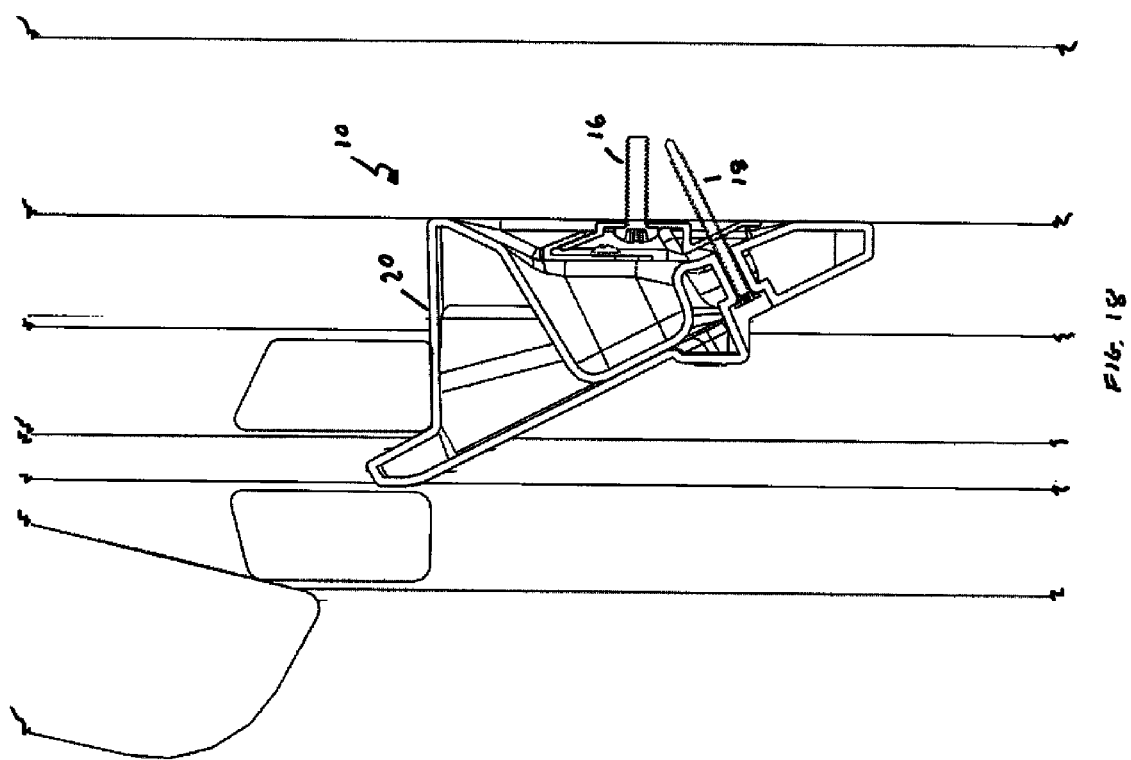

HANGER APPARATUS AND METHOD OF HANGING

CROSS-REFERENCE TO RELATED APPLICATIONS

This application claims priority of U.S. Provisional Patent Application Ser. No. 61/806,445 filed Mar. 29, 2013.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

REFERENCE TO A "SEQUENCE LISTING," TABLE OR COMPUTER PROGRAM LISTING APPENDIX

Not Applicable.

BACKGROUND OF THE INVENTION

1. Field of the Invention

The present invention relates to a hanger apparatus and method of hanging a chair on the hanger apparatus and, more particularly, to a hanger apparatus comprising a shaped exterior shell or casing and fasteners that easily attach to and detach from a vertical structure such as a wall.

2. Background Art

Benefits of the hanger apparatus of the present invention include intuitive and easy use, impossibility of incorrect placement of a chair, reduction of damage to both a wall and chair with use of the hanger apparatus, increase of flexibility and variability of placement or location of the hanger apparatus, and compatibility of the hanger apparatus with existing chairs, both those with and without hooks, and with a variety of chair widths.

The present invention is easy to clean and meets healthcare expectations, is easy to install, is easily attached, detached and reinstalled (e.g., for wall painting) and is durable. Other benefits of the hanger of the present invention include its sleek design such that chairs do not protrude and thus cause unsafe conditions.

SUMMARY OF THE INVENTION

In accordance with the invention, a chair hanger apparatus is provided for selectively hanging a folding chair on a structural vertical support member. The chair hanger apparatus includes at least one anchor adapted to be secured to a structural vertical support member. A forwardly and inwardly extending member has an upper surface and first and second distal ends. An upwardly extending portion intermediate between the first and second distal ends is also provided. The forwardly and inwardly extending member is adapted to engage a cross rail of a folding chair to be hung on the hanger apparatus.

In accordance with other concepts of the invention, a mounting bracket is connected to the forwardly and inwardly extending member. The mounting bracket is adapted to selectively engage an end of the anchor. A fastening means is adapted to engage at least one of the forwardly and inwardly extending member, mounting bracket and anchor, so as to impede relative vertical motion therebetween.

The structural vertical member can include a wall. The mounting bracket can be disposed between the forwardly and inwardly extending member, and the structural vertical support member.

In accordance with other concepts of the invention, the forwardly and inwardly extending member can include a formed exterior shell. With this configuration, the upper surface of the forwardly and inwardly extending member extends from the first distal end to the second distal end. This extension occurs for a distance greater than the length of the cross rail of the folding chair hung on the hanger apparatus. Still further, the cross rail of the folding chair hung on the hanging apparatus is supported by the upper surface of the forwardly and inwardly extending member. In addition, the upwardly extending portion of the forwardly and inwardly extending member is adapted to impede relative horizontal motion of the cross rail of the folding chair hung on the hanger apparatus.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 7 illustrates a right side view of the hanger apparatus;

FIG. 8 illustrates a left side view of the hanger apparatus;

FIG. 18 illustrates a sectional view taken along line b-b of FIG. 16 showing a partial centerline sectional view of the hanger apparatus with a chair.

DETAILED DESCRIPTION OF PREFERRED EMBODIMENTS

The present invention comprises a hanger apparatus that is attachably and detachably disposed on a vertical structure including but not limited to a wall, a door, or a column.

The preferred embodiment of the present invention comprises a hanger comprising an exterior shell or casing shaped to mate with and support a chair such as a traditional folding wooden chair, a fastener component, and fasteners such a bolts, lag bolts, and screws. The fastener component preferably comprises a french cleat system. However, it is readily apparent that configurations for the hanger other than those of an exterior shell or casing can be utilized, without departing from the spirit and scope of the novel concepts of the invention.

Figure 1:
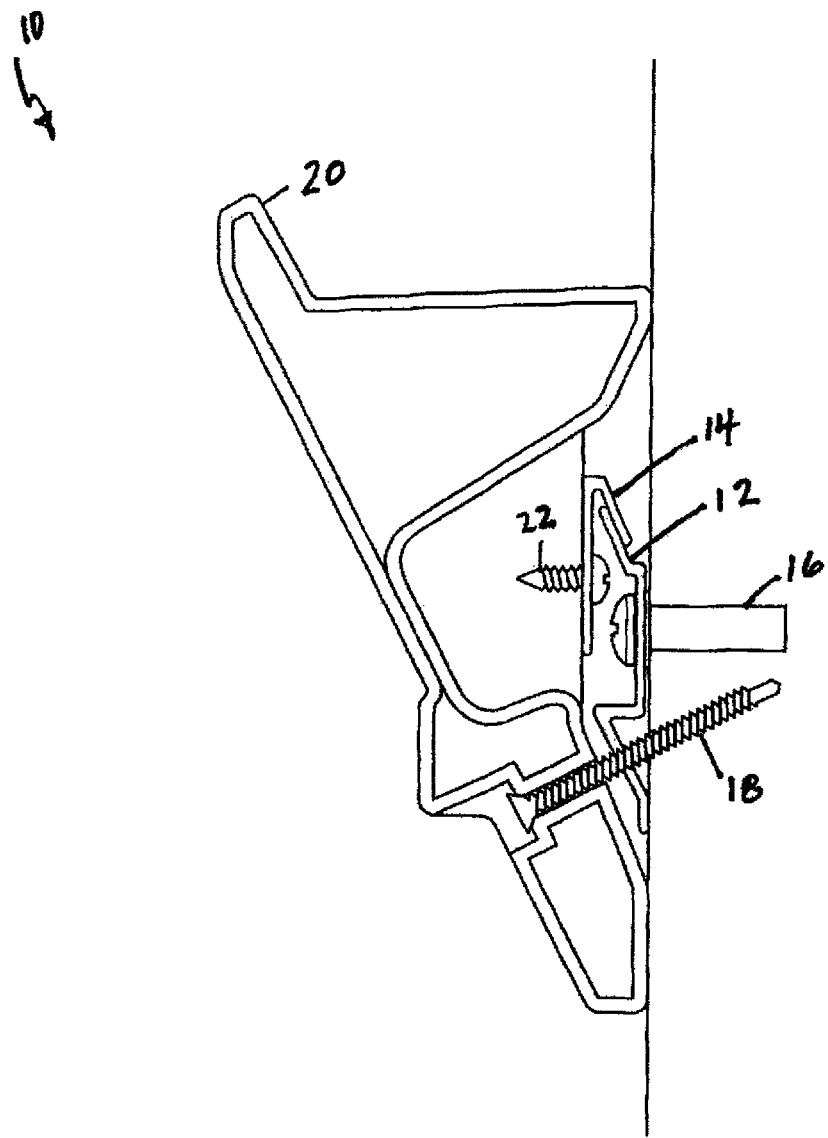
FIG. 1 illustrates a side cut-away view of the hanger apparatus of the present invention attached to a wall.

FIG. 1 illustrates a side sectional view of the hanger apparatus of the present invention attached to a wall. Hanger apparatus 10 comprises anchor 12, hook 14, fastener 16, fastener 18, exterior casing or shell 20, and secondary fastener 22. Anchor 12 is attached to a vertical structure such as a wall by a plurality of fasteners 16. Anchor 12 comprises an opening through which fastener 16 is disposed to securely attach hanger 10 to a structural member such as a wall. Hook 14 is disposed over anchor 12. Hook 14 is firmly attached to exterior shell 20 of hanger 10 via fastener 22. Fastener 22 comprises a screw. Fastener 18 comprising a self-tapping screw stabilizes and secures exterior shell 20 to the anchor 12. Hook 14 and anchor 12 comprise a french cleat style attachment system.

Figure 2:
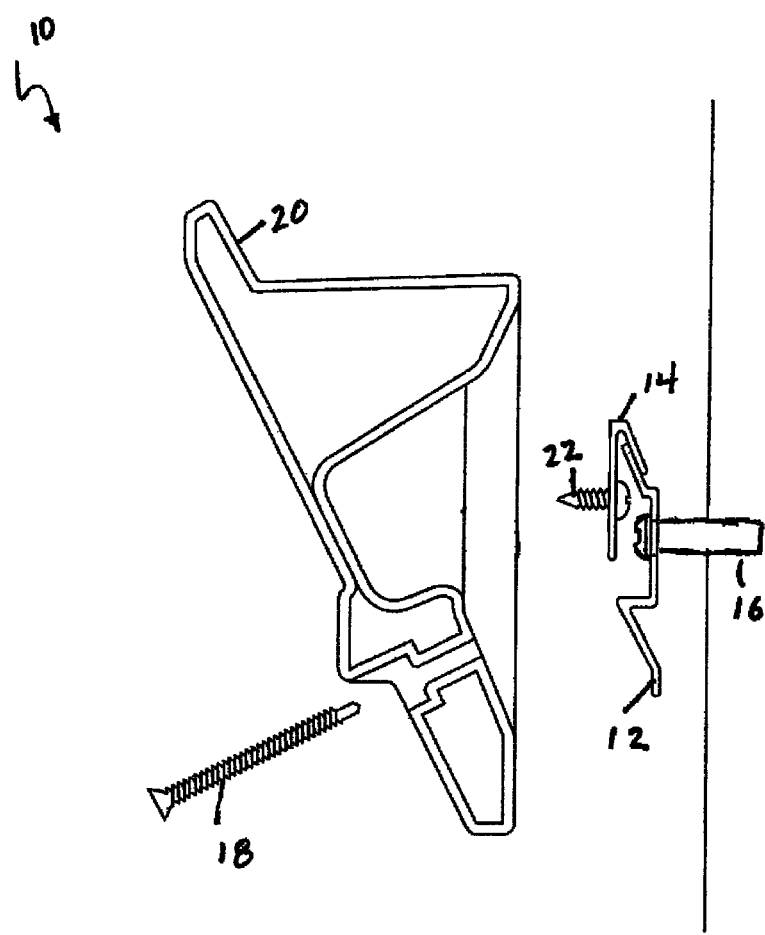
FIG. 2 illustrates a side cut-away exploded view of the hanger apparatus.

FIG. 2 illustrates a side cut-away exploded view of the hanger apparatus. Hanger apparatus 10 comprises anchor 12, hook 14, fastener 16, fastener 18, exterior casing or shell 20, and secondary fastener 22.

Figure 3:
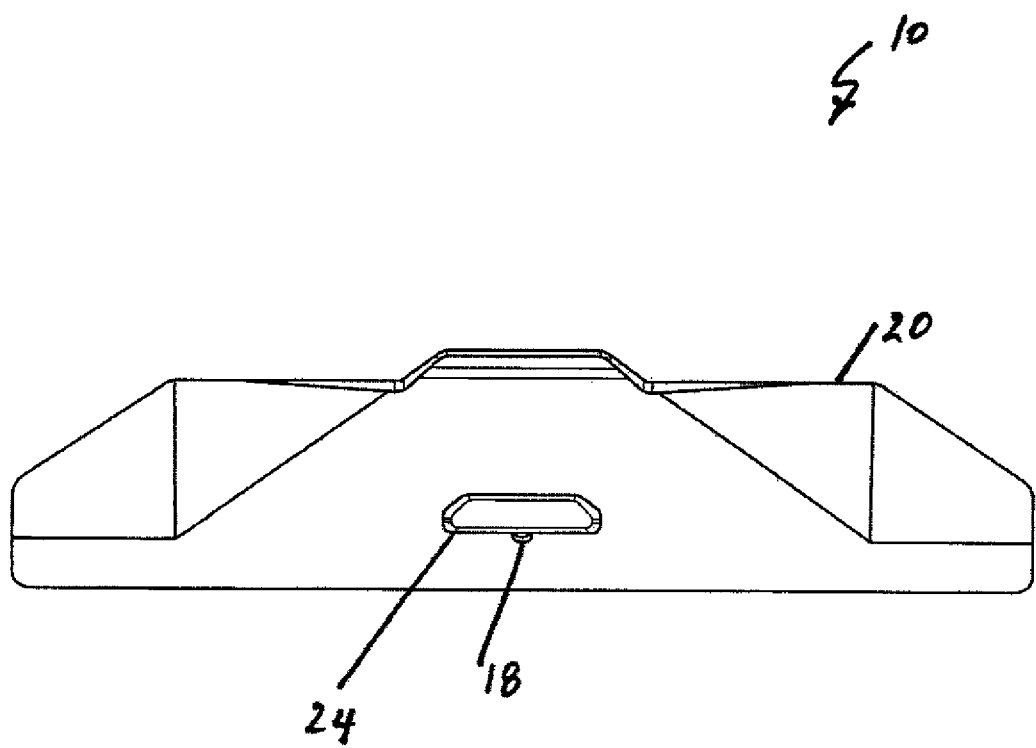
FIG. 3 illustrates a front view of the hanger apparatus.

FIG. 3 illustrates a front view of the hanger apparatus detached. FIG. 3 more fully illustrates configuration of hanger apparatus 10 comprising exterior shell or casing 20, plate 24 and fastener 18 comprising a self-tapping screw.

Figure 4:
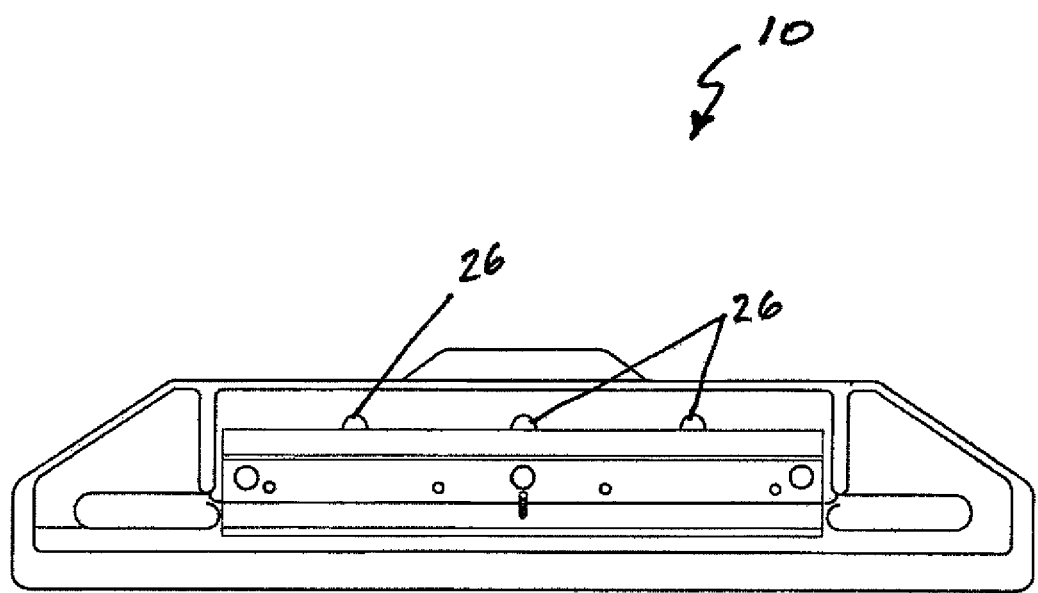
FIG. 4 illustrates a rear view of the hanger apparatus.

FIG. 4 illustrates a rear view of the hanger apparatus, including the hook 14. Exterior shell 20 comprises a variety of openings 26.

Figure 5:
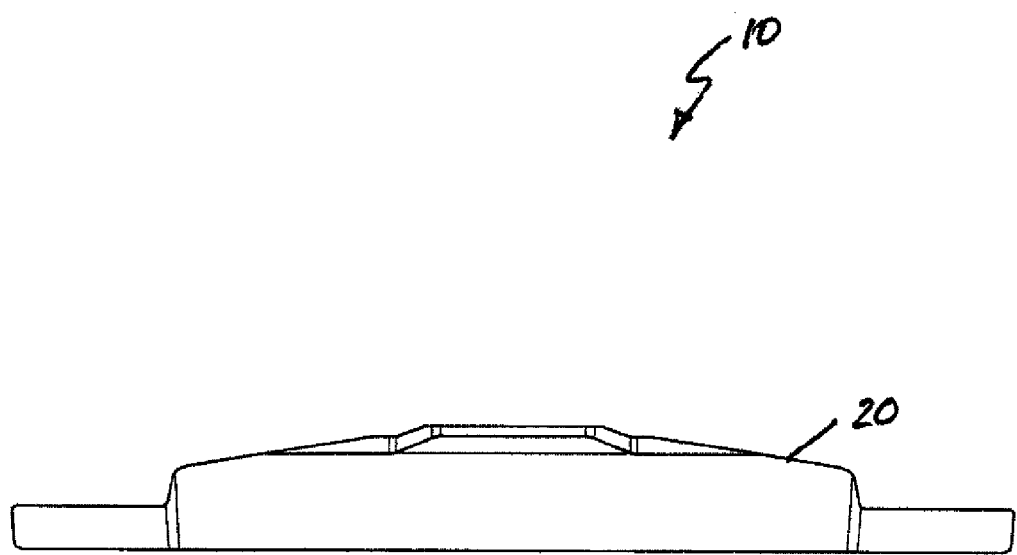
FIG. 5 illustrates a top view of the hanger apparatus.

FIG. 5 illustrates a top view of the hanger apparatus.

Figure 6:
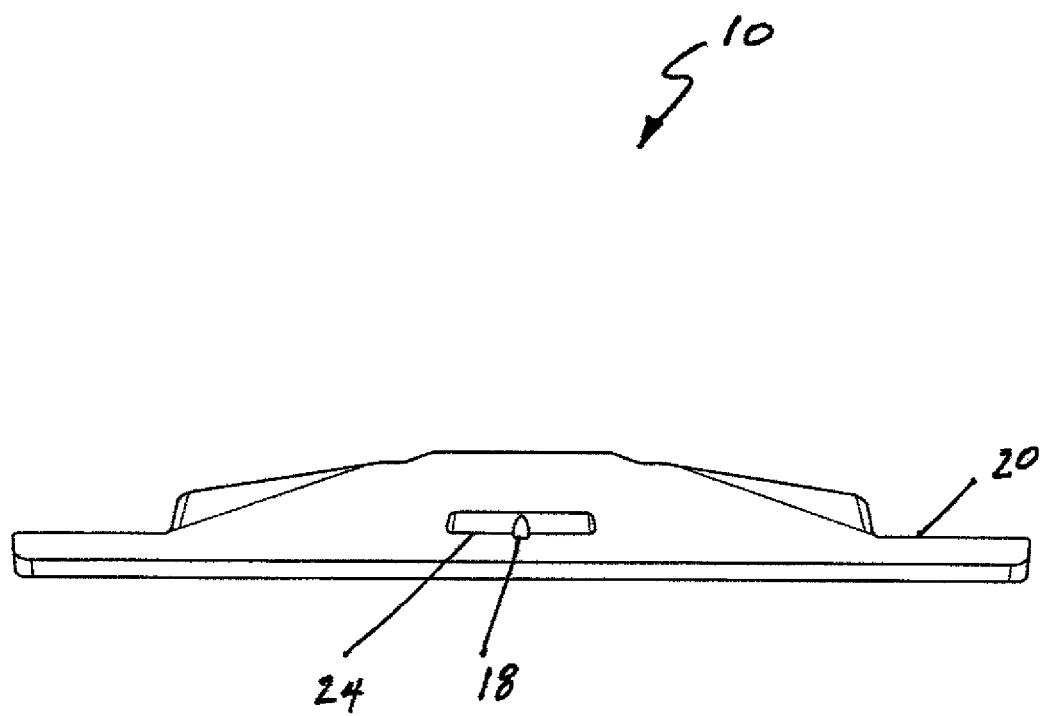
FIG. 6 illustrates a bottom view of the hanger apparatus.

FIG. 6 illustrates a bottom view of the hanger apparatus, showing plate 24 disposed internal to exterior shell 20 and fastener 18 securing hanger apparatus to an anchor.

Figure 9:
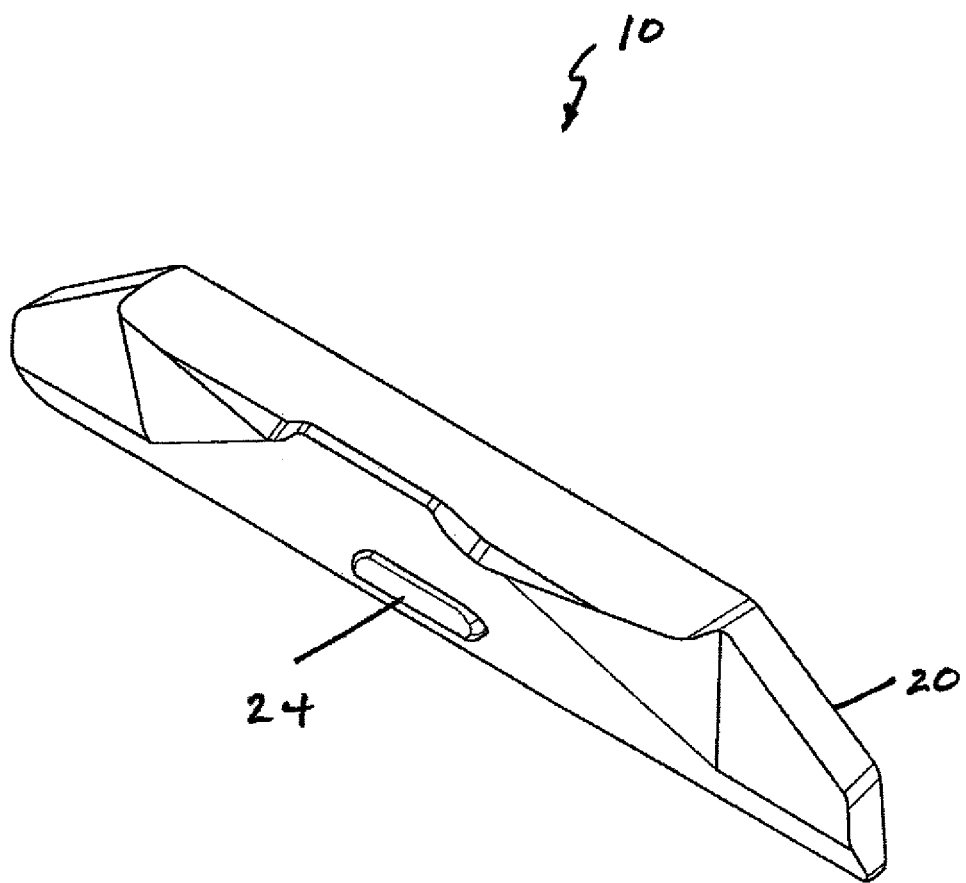
FIG. 9 illustrates a top perspective view of the hanger apparatus.

FIG. 7 illustrates a right side view of the hanger apparatus, FIG. 8 illustrates a left side view of the hanger apparatus, and FIG. 9 illustrates a top perspective view of the hanger apparatus of the present invention.

Figure 10:
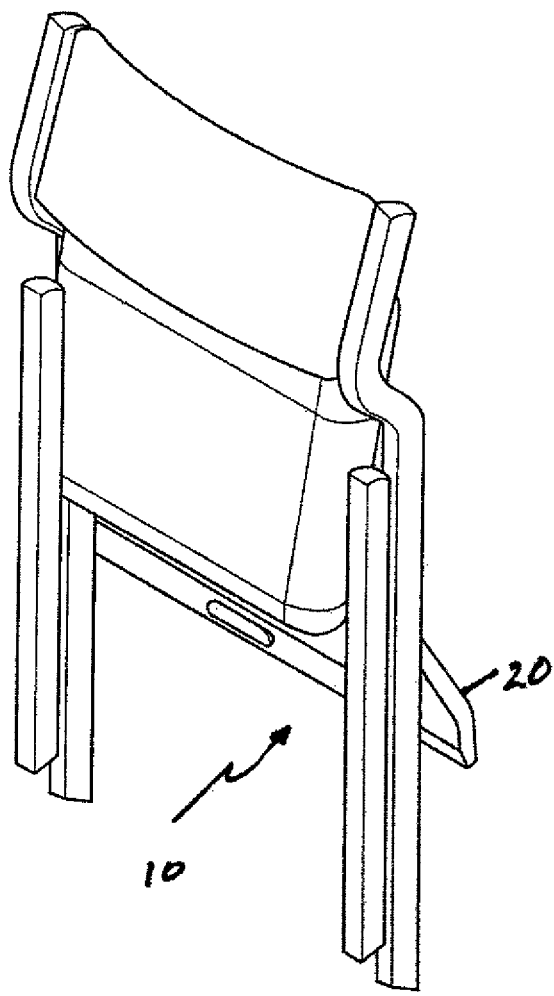
FIG. 10 illustrates a top perspective view of the hanger apparatus with a chair.
Figure 11:
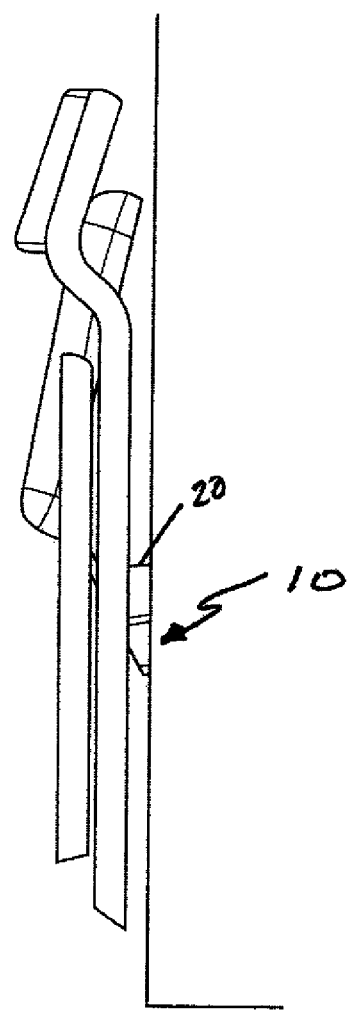
FIG. 11 illustrates a side view of the hanger apparatus with a chair.

FIG. 10 illustrates a top perspective view of the preferred embodiment of the hanger apparatus with a chair disposed on hanger 10. FIG. 11 illustrates a side view of the hanger apparatus with a chair disposed on the hanger apparatus. FIGS. 10 and 11 illustrate how a chair is disposed on and interfaces with hanger 10. The chair depicted in FIG. 10 and FIG. 11 is the Sauder Manufacturing Plyfold® chair described in U.S. Pat. No. 0275,533, the disclosure of which is incorporated herein by reference, although it will be understood that the hanger can be adapted to be used with any conventional folding chair. As somewhat shown in FIGS. 10 and 11, but as primarily shown in FIG. 18, Hanger 10 is mounted to a wall by hook 14 and anchor 12 comprising a french cleat system. Shell 20 is secured to the french cleat system by fastener 22 comprising a screw or any other similar fastener. As FIGS. 10 and 11 illustrate, a chair's front stretcher rail serves as the hanging feature that hangs securely, attachably, and detachably to hanger 10's uniquely designed exterior shell 20. The shape and dimensions of exterior shell 20 of hanger 10 interact with a chair's front stretcher rail and the chair's front legs in such a way that the chair is securely captured and retained while also protecting the vertical structure or wall to which hanger 10 is attached from damage by contact by the chair. Thus, the possibility of a chair being hung incorrectly or insecurely is effectively minimized.

Figure 12:
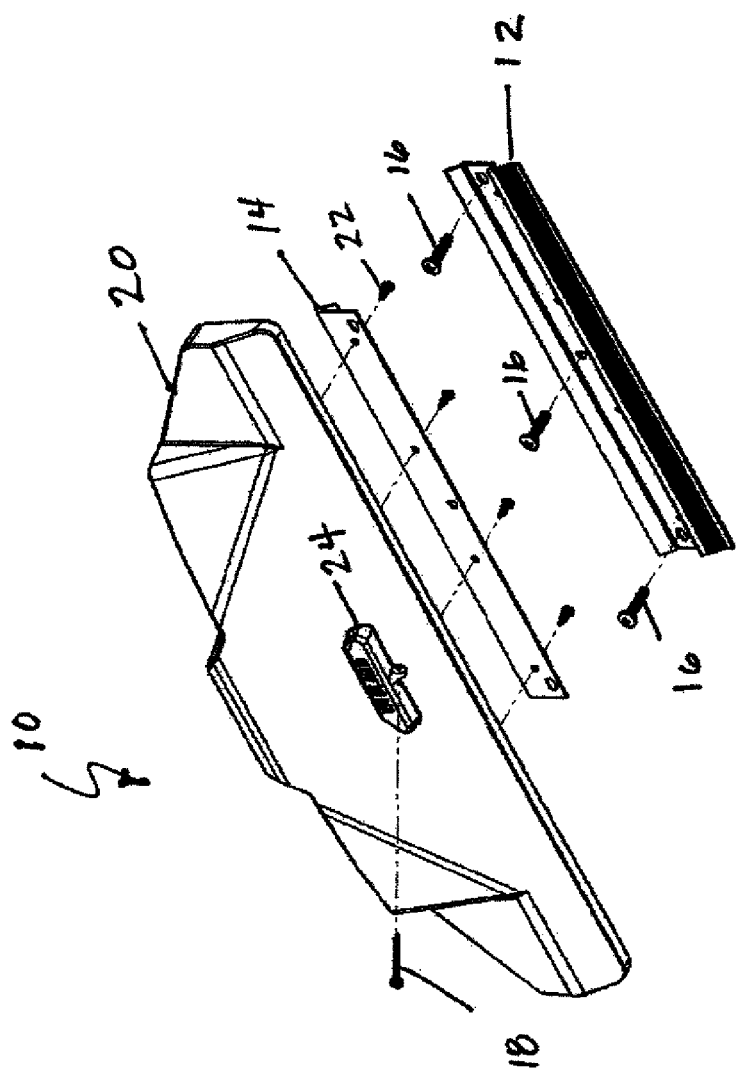
FIG. 12 illustrates a front perspective exploded view of the hanger apparatus.

FIG. 12 illustrates a front perspective exploded view of the hanger apparatus that more particularly illustrates the parts of the french cleat system. Anchor 12 is attached to vertical structural member such as a wall via a plurality of fasteners 16. Hook 14 is attached to exterior shell 20 via fasteners 22 comprising screws. Hook 14 mates with the top edge of anchor 12 so as to engagedly secure exterior shell 20 to anchor 12. Fastener 18 comprising a self-tapping screw is easily installed through exterior shell 20 and extending through anchor 12 so as to mate exterior shell 20 and anchor 12 in a fashion so as to prevent disengagement of hook from the top edge of anchor 12. Thus hanger 10 is easily secured to a wall, column, door or other structural vertical surface. As depicted in FIG. 1, fastener 18 is of sufficient length to pass through exterior shell 20, through anchor 12 and into the structural vertical surface to which the anchor is attached. It will be understood that fastener 18 need not extend into the structural vertical surface and a shorter fastener than that depicted which is of sufficient length to pass through exterior shell 20 and through anchor 12 without extending into the structural vertical surface to which the anchor is attached may equally be used. Plate 24 is integral to the exterior shell 20 and is designed to permit identifying information to be displayed and, further, functions to obscure view of the hole for fastener 18 from typical line-of-sight.

Figure 13:
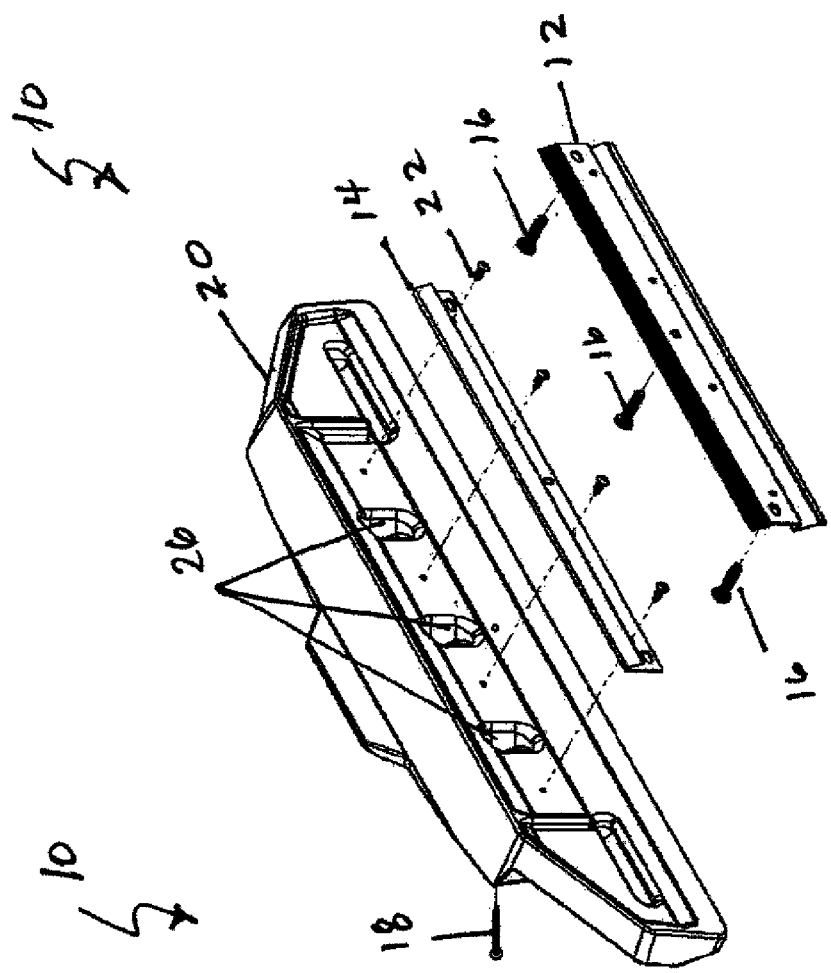
FIG. 13 illustrates a rear perspective exploded view of the hanger apparatus.

FIG. 13 illustrates a rear perspective exploded view of the hanger apparatus. Tack-offs 26 can be provided as part of the exterior shell 20 to increase structural strength of exterior shell 20 which is preferably blow molded. Further, however, other structure and processes could be utilized to provide relatively increased strength for the exterior shell 20. Further, it can easily be envisioned to utilize processes of manufacture other than blow molding.

Figure 14:
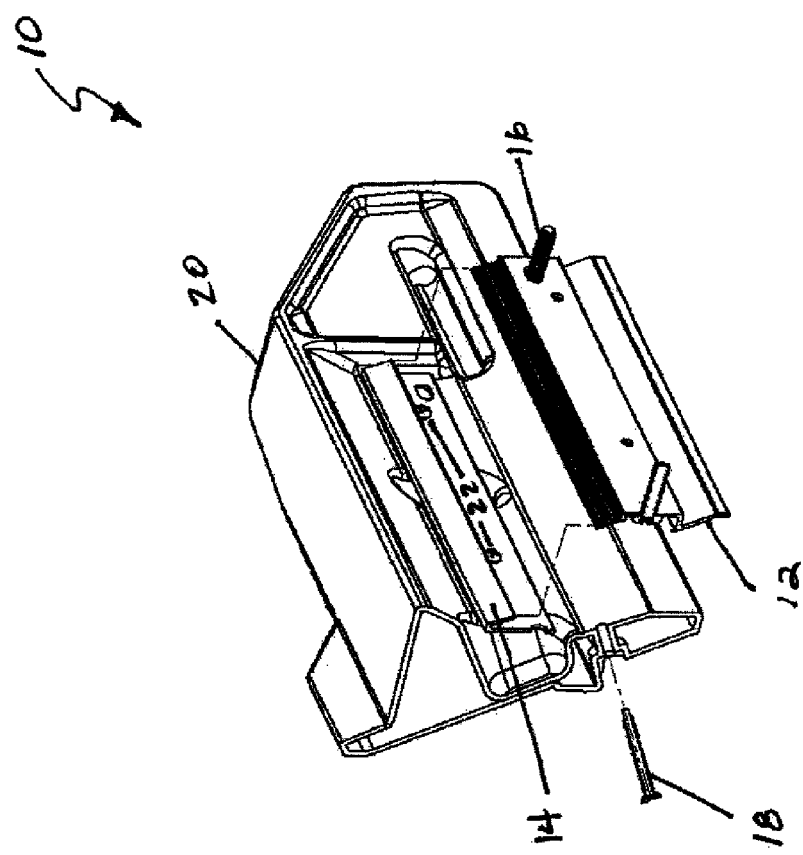
FIG. 14 illustrates a sectional exploded rear perspective view of a portion of the hanger apparatus.
Figure 15:
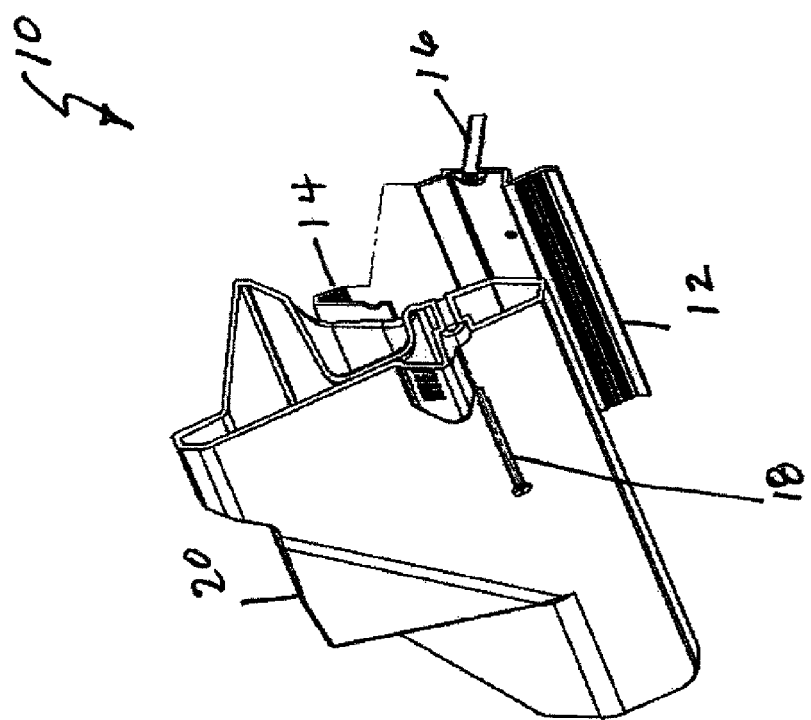
FIG. 15 illustrates a front perspective exploded sectional view of the hanger apparatus.
Figure 17:
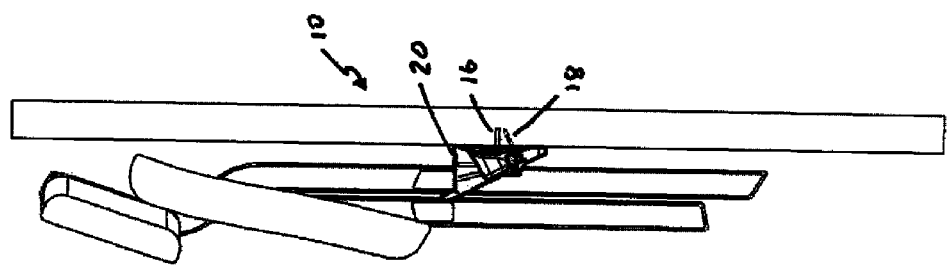
FIG. 17 illustrates a centerline sectional view taken along line a-a of FIG. 16 showing the hanger with a chair.

FIG. 14 illustrates a rear perspective view and FIG. 15 illustrates a side view of the hanger apparatus illustrating the location of fastener 18. FIGS. 17-18, inclusive, illustrate the hanger apparatus mounted to a wall or door and having a folding chair engaged thereon.

Figure 16:
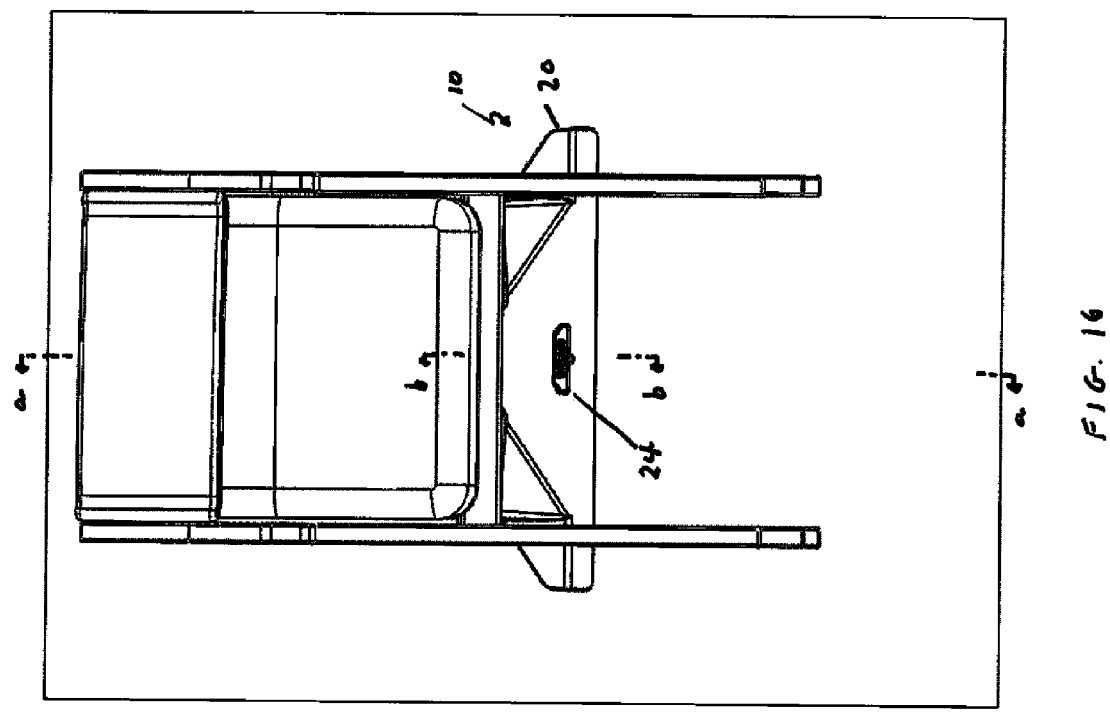
FIG. 16 illustrates a front view of the hanger apparatus with a chair.

After installation of the hanger 10 to a structural vertical surface such as a wall, column or door as described above, a chair may be hung thereon as depicted in FIGS. 10 and 11. The exterior shell 20 is shaped and sized such that the upper edge of the exterior shell 20 engages the stretcher rail of the chair with the sloped upper edge of the exterior shell 20 and the side surfaces of the exterior shell 20 acting to center the chair on the hanger. The inwardly sloping nature of the upper edge of exterior shell 20 is further shaped and sized such that the force of gravity urges a chair placed in the hanger into a desired position close against the structural vertical surface. As shown in FIG. 16, the exterior shell 20 is further shaped and sized such that the sides of the exterior shell 20 prohibit lateral shifting of the chair after hanging by acting as stops against the inside surfaces of the chair legs so as to limit lateral movement.

It is to be understood that this invention is not limited to the embodiments and modifications described in the specification. Modifications and variations can be made by one skilled in the art without departing from the spirit and scope of the invention. Moreover, any one or more features of any embodiment of the invention may be combined with any one or more other features of any other embodiment of the invention, without departing from the scope of the invention.

Although the invention has been described in detail with particular reference to these preferred embodiments, other embodiments can achieve the same results. Variations and modifications of the present invention will be obvious to those skilled in the art and it is intended to cover all such modifications and equivalents.

We claim:

1. A chair hanger apparatus for selectively hanging a folding chair on a structural vertical support member, said apparatus comprising:
   at least one anchor adapted to be secured to a structural vertical support member;
   a forwardly and inwardly extending member having an upper surface and having first and second distal ends and an upwardly extending portion intermediate between said first and second distal ends wherein said forwardly and inwardly extending member is adapted to engage a cross rail of a folding chair to be hung thereon;
   a mounting bracket connected to said forwardly and inwardly extending member wherein said mounting bracket has a hook adapted to selectively mate with a top edge of said anchor; and
   a fastener adapted to extend through said forwardly and inwardly extending member and the anchor so as to impede relative vertical motion therebetween.

2. A chair hanger according to claim 1 wherein said structural vertical support member comprises a wall.

3. A chair hanger according to claim 1 wherein said mounting bracket is disposed between said forwardly and inwardly extending member and said structural vertical support member.

4. A chair hanger according to claim 1 wherein said forwardly and inwardly extending member comprises a formed exterior shell.

5. A chair hanger according to claim 3 wherein said upper surface of said forwardly and inwardly extending member extends from said first distal end to said second distal end a distance greater than the length of the cross rail of said folding chair hung thereon.

6. A chair hanger according to claim 5 wherein said cross rail of said folding chair hung thereon is supported by said upper surface of said forwardly and inwardly extending member.

7. A chair hanger according to claim 3 wherein said upwardly extending portion of said forwardly and inwardly extending member is adapted to impede relative horizontal motion of said cross rail of said folding chair hung thereon.

8. A chair hanger apparatus for selectively hanging a folding chair on a structural vertical support member, said apparatus comprising:
   a forwardly and inwardly extending member, said extending member comprising an upper surface and
   first and second distal ends of the upper surface extending laterally of the forwardly and inwardly extending member;
   an upwardly extending portion intermediate said first and said second distal ends; and
   means for directly or indirectly connecting said forwardly and inwardly extending member to a structural vertical support member;
   wherein said forwardly and inwardly extending member is adapted to receive a cross rail of a folding chair to be hung thereon between the upwardly extending portion and the structural vertical support member.

9. A chair hanger according to claim 8 wherein said forwardly and inwardly extending member comprises a formed exterior shell.

10. A chair hanger in accordance with claim 8 wherein said upper surface of said forwardly and inwardly extending member extends from said first distal end to said second distal end a distance greater than the length of the cross rail of said folding chair hung thereon.

11. A chair hanger according to claim 10 wherein said cross rail of said folding chair hung thereon is supported by said upper surface of said forwardly and inwardly extending member.

12. A chair hanger according to claim 8 wherein said upwardly extending portion of said forwardly and inwardly extending member is adapted to impede relative horizontal motion of said cross rail of said folding chair hung thereon.

13. A chair hanger apparatus for selectively hanging a folding chair on a structural vertical support member, said apparatus comprising:
   at least one anchor adapted to be secured to said structural vertical support member;
   an extending member adapted to engage a folding chair to be hung thereon;
   a mounting bracket connected to said extending member, wherein said mounting bracket has a hook adapted to selectively mate with a top edge of said anchor; and
   a fastener adapted to secure said extending member to the anchor.

14. A chair hanger in accordance with claim 13 wherein said support member comprises a wall.

15. A chair hanger according to claim 13 wherein said mounting bracket is disposed between said extending member and said wall.

* * * * *